United States Patent Office 3,168,264
Patented Feb. 2, 1965

3,168,264
GUIDANCE SYSTEMS FOR MISSILES AND OTHER MOVING BODIES
John Leonard Sendles, Belfast, Northern Ireland, assignor to Short Brothers & Harland Limited, Belfast, Northern Ireland, a British company
Filed Feb. 15, 1961, Ser. No. 112,134
Claims priority, application Great Britain, Feb. 23, 1960, 6,401/60
8 Claims. (Cl. 244—14)

The present invention relates to guidance systems for missiles and other moving bodies.

Various proposals have been made for the automatic homing of a missile on to a target. It will be appreciated that although such automatic homing is very desirable for some purposes, it leads to considerable missile complication especially when it is necessary to vary the guidance and control parameters throughout flight in order to achieve an optimum missile performance.

It is one object of the present invention to provide a guidance system for a missile in which the above mentioned complication is eliminated.

According to the present invention there is provided a guidance system for a missile or other moving body comprising a radar-signal receiving device mounted in the body for receiving radar signals from a remote target and for generating signals representative of the relative positions of the body and the target, a radio transmitter mounted in the missile for transmitting said signals, a receiver located at an operator's station for receiving said signals, a display device located at the operator's station and responsive to the received signals to produce a visual representation of the relative positions of the body and the target, a manually-operable control device for operation by a human operator to generate control signals in response to manual adjustment thereof, a further radio transmitter at the operator's station for transmitting said control signals, a further receiver mounted in the missile for receiving said control signals, and a missile control system responsive to received control signals to guide the missile in accordance with the operator's control movements of the manually-operable control device.

Figure 1:
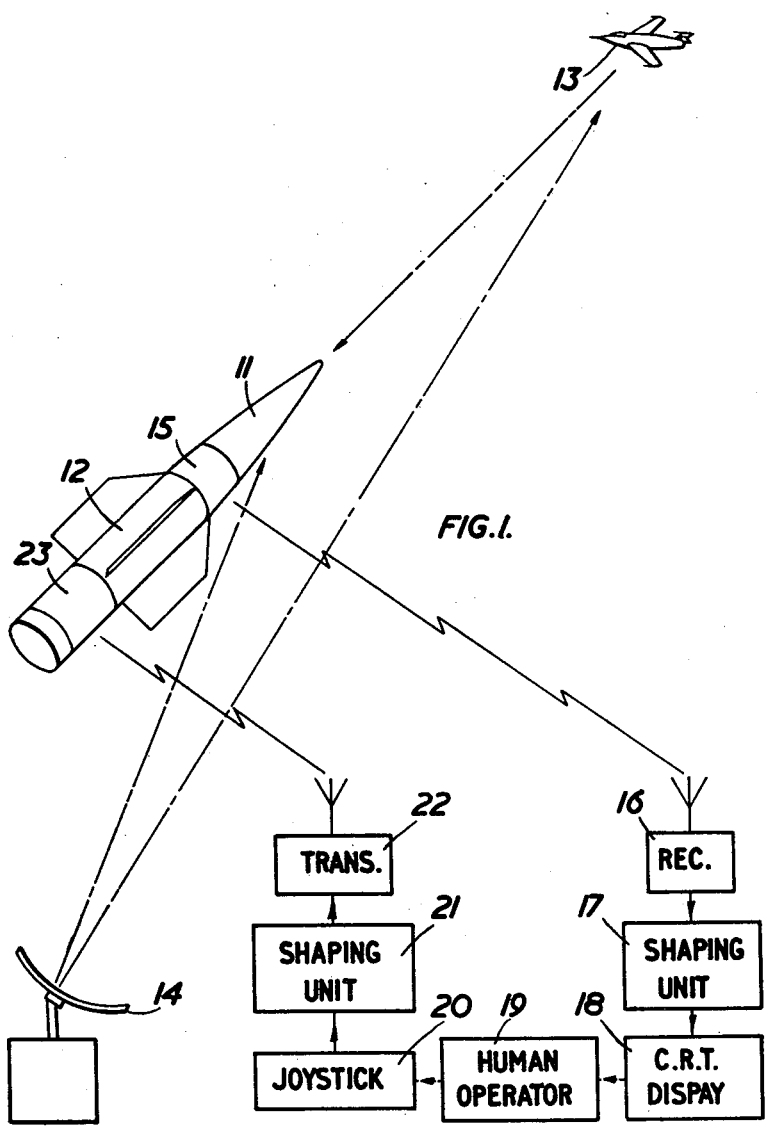
Figure 2:
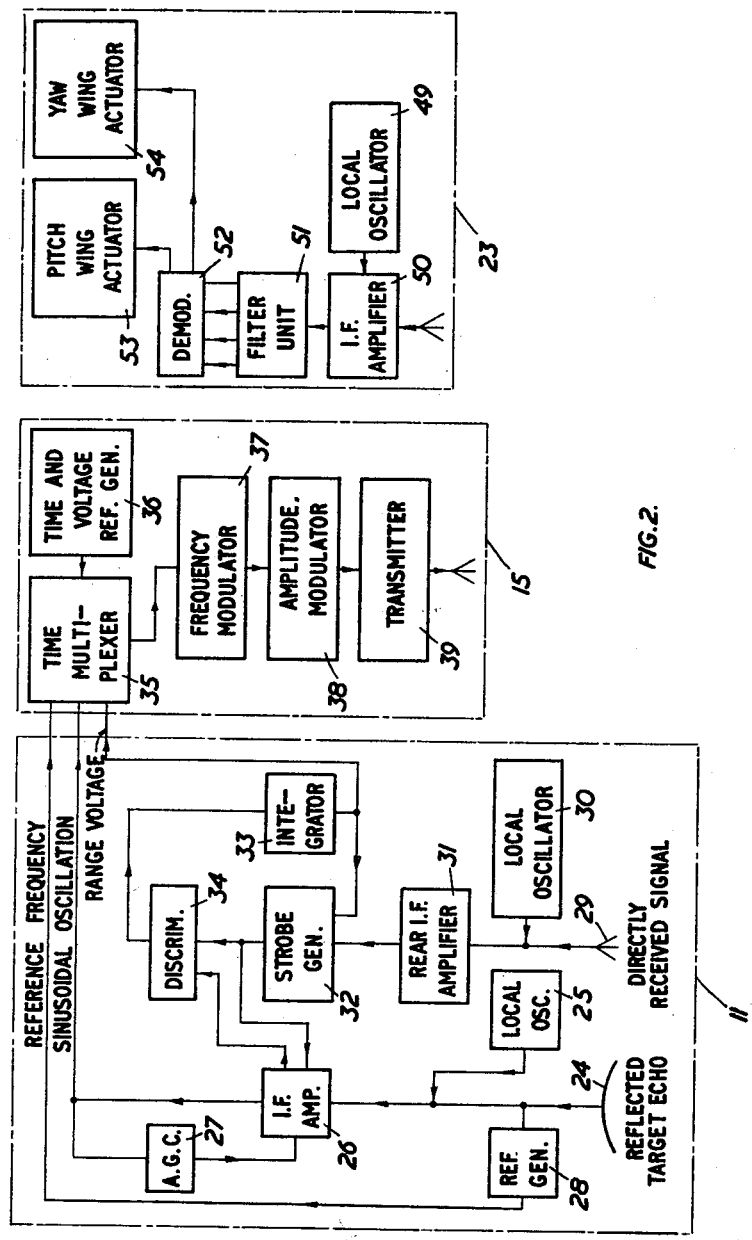
Figure 3:
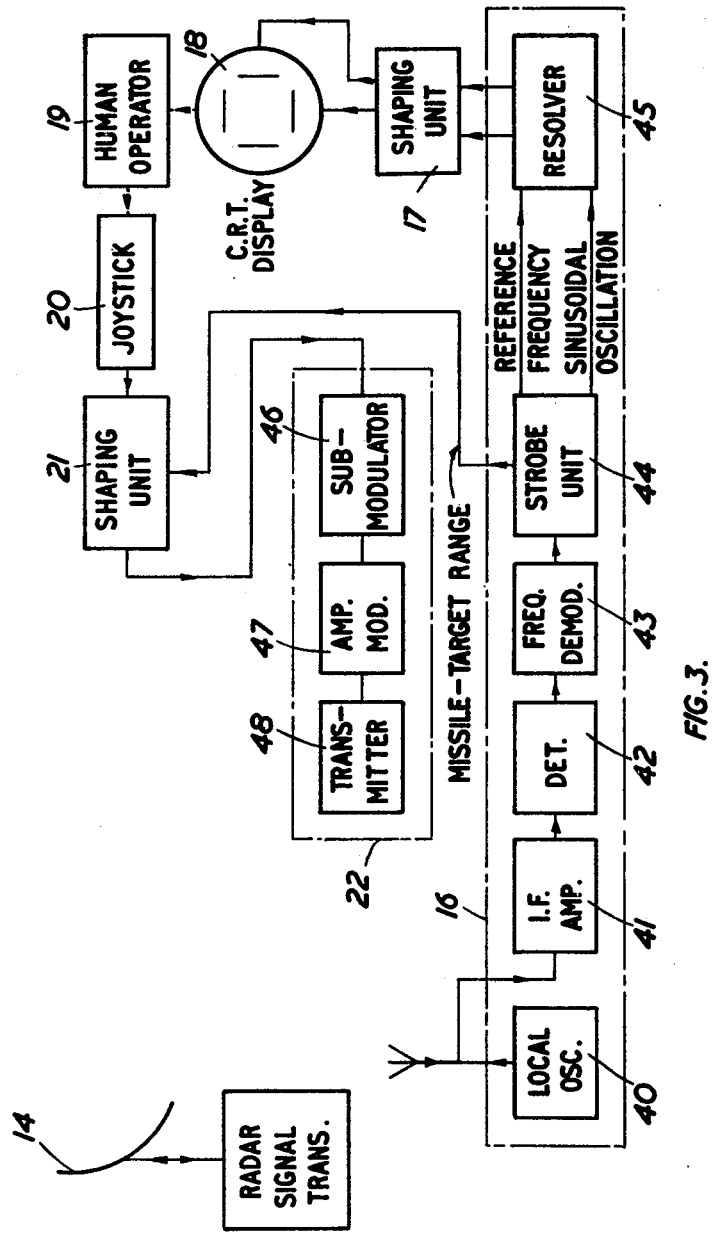
Figure 4:
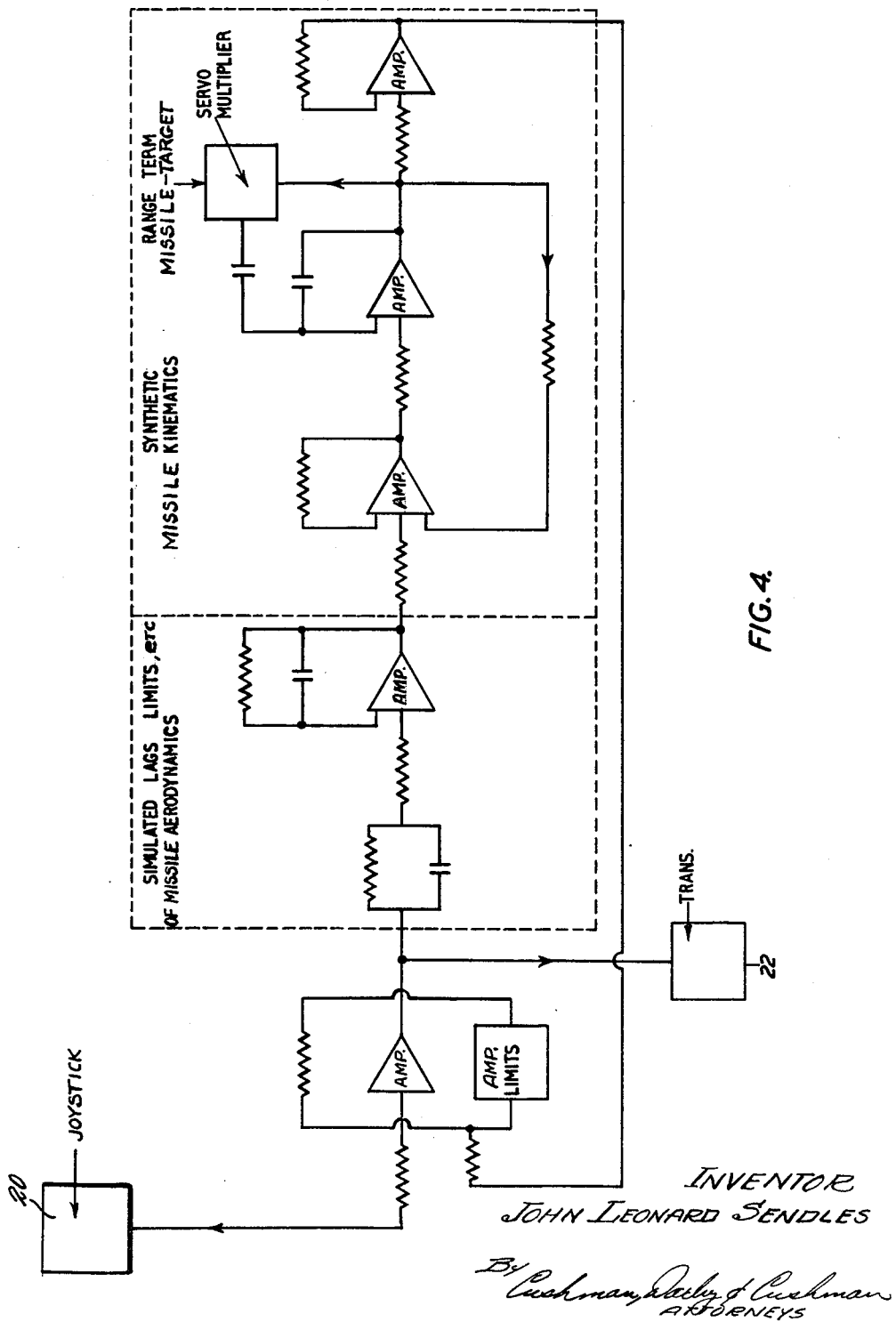

One embodiment of the invention will now be described by way of example with reference to the accompanying drawings in which:

FIG. 1 is a block schematic diagram of a missile guidance system for guiding an airborne missile to a remote airborne target under the control of a human operator located on the ground, FIG. 2 is a block schematic diagram of electrical apparatus housed within the missile shown in FIG. 1 and forming part of the guidance system, FIG. 3 is a block schematic diagram of electrical apparatus mounted on the ground for use by a human operator, and FIG. 4 is a block schematic diagram of the control signal shaping unit 21 shown in FIGURE 3.

Referring first to FIG. 1, a radar-signal guidance receiver 11 is located in a forward region of a missile 12 and forms part of a semi-active radar-pulse system in which a target 13 is illuminated by a ground-based radar-signal transmitter 14 which is locked on to the target. The guidance receiver 11 is arranged to generate signals representative of the relative positions of the missile 12 and the target 13. A data link transmitter 15 is mounted in the missile 12 and transmits these signals to a data link receiver 16 located at a ground station. The signals received by the receiver 16 are suitably modified in a shaping unit 17 and applied to a cathode ray display apparatus 18 to produce a visual representation of the relative positions of the missile 12 and the target 13. A human operator 19, in response to the visual representation on the display device 18, adjusts a joystick 20 to guide the missile 12 in the required direction. The joystick 20 is arranged to generate control signals for transmission to the missile 12 and these signals are applied via the shaping unit 21 in which they are suitably modified, to a ground command-link transmitter 22 from which they are transmitted to a command link receiver 23 mounted in the missile 12. The signals received by the receiver 23 are employed to control the operation of the actuators of the appropriate control surfaces of the missile 12.

Referring now to FIG. 2, the radar-signal guidance receiver 11 comprises a space stabilized dish or reflector 24 carried within a two-axis gimbal system (not shown). This gimbal system allows the dish to be oriented in a predetermined position in space whereby the dish is independent of the orientation of the missile. Conical scanning of the target region by the receiving dish 24 is effected by providing a dipole offset from the main axis of the dish 24 and by spinning the dipole and dish assembly about the latter axis.

The R.F. output of the dish is converted to I.F. by mixing it with the output from a local oscillator 25 and is then amplified by an I.F. amplifier 26 on which an A.G.C. system 27 operates to reduce the effects of changing signal strength. The output of the I.F. amplifier 26 which is amplitude-modulated at the spin frequency of the dipole is fed to the data link transmitter 15 located in the missile 12.

It is convenient to resolve the angle between the dish axis and the missile-target sight line into component pitch and yaw angles and to do this a reference signal representing a datum position of the dipole is required. The reference signal is provided by a pulse generator 28 adapted to generate a short duration pulse each time a contact on the rotating dish 24 passes through a horizontal plane. Since the resolution is to be carried out on the ground this reference signal is also fed to the data link transmitter 15.

In order to discriminate between the wanted target-reflected pulse signal and other spurious signals, means are provided in the missile guidance receiver 11 for generating a strobe signal from the signal directly received from the ground radar-signal transmitter 14 and for gating the target reflected signal by this strobe signal. To achieve this there is provided a signal receiving aerial 29 for receiving signals direct from the radar signal transmitter 14. The received signals are converted to I.F. by mixing with the output from a local oscillator 30 and are then amplified by an I.F. amplifier 31. The output of the I.F. amplifier 31 is fed to a strobe generator 32 for generating strobe signals for gating the I.F. amplifier 26. The strobe signals must be automatically delayed and this is accomplished by incorporating a delay device in the strobe generator 32 and adjusting the delay in accordance with a voltage fed thereto proportional to the integral of the time displacements between the strobe signal and the target reflected signal. The last mentioned control voltage is obtained from an integrator 33 to which is applied the output of a discriminator 34 fed with strobe signals from the generator 32 and target reflected signals from the I.F. amplifier 26. The control voltage from the integrator 33, which is proportional to approximately the distance between the target and the missile is extracted and fed to the data-link transmitter 15 for transmission back to ground where it is required for a purpose hereinafter described.

The data link transmitter is used to transmit the following signals:

(a) A reference-frequency oscillation.

(b) An approximate sinusoidal oscillation whose amplitude and phase relative to the reference oscillation are required.
(c) A D.C. signal containing range information.
(d) Voltage and time reference signals.

The above information-carrying signals are time-multiplexed in a multiplexer 35 into a signal of complex wave form consisting of (b) overridden at intervals by three pulses whose amplitudes and phases contain the data of (a), (c), (d) and an additional time reference signal generated by a generator 36 to facilitate de-multiplexing.

This complex waveform is then used in a modulator 37 to frequency modulate a sub-carrier oscillation which is applied in turn to a modulator 38 to amplitude modulate a main carrier oscillation. The latter is then applied to a transmitter 39 from which it is radiated. This is basically a Frequency Modulation Pulse Amplitude Modulation System.

Referring now to FIG. 3, at the ground station there is provided the data-link receiver 16 for receiving the modulated carrier oscillation. In the receiver, the received signal is converted to I.F. by mixing with the output of a local oscillator 40, is amplified in an I.F. amplifier 41 and is fed to a detector 42, where the sub-carrier amplitude modulation is extracted. The frequency-modulated sub-carrier oscillation from the detector 42 is applied to a frequency demodulator 43 which reproduces the time-multiplexed information-carrying signals. The information-carrying pulses are identified and separated from the information-carrying sinusoidal oscillation, using known gating techniques in a strobe unit 44.

The separated pulses and the sinusoidal oscillation are then used in one of two ways. The pulses containing voltage information and calibration data are smoothed to produce D.C. voltages while the pulses carrying the reference-frequency information are used to phase detect the sinusoidal oscillation in a resolver 45 in order to resolve the error angle into pitch and yaw component angles and to generate separate output signals representative of these component angles.

The output signals from the resolver 45 are applied to the display-signal shaping unit 16, which may be of well known form and which serves to shape the output signals to provide suitable input signals for the display device 18. The shaping unit 17 includes filters to reduce noise due to "glint" and other radar noise and to take account of gain changes due to varying missile-target range that may be necessary to give a linear display.

The display device 18 consists of a short persistence cathode ray tube with a graticule in the centre to mark a zero error position. The yaw and pitch error signals are fed from the display shaping unit 17 to the x and y plates respectively of the tube to give a direct visual display of the situation to the human operator 19.

In close proximity to the display device 18 there is provided the human operator's control apparatus 20 comprising a joystick arranged to generate control signals in response to movements thereof by the operator. The control signals are applied to the control-signal shaping unit 21 which is essentially an analogue of the missile control system. The control-circuit shaping unit 21 is shown in block diagram form in FIGURE 4. In the shaping unit 21 the control signals are fed into a high gain amplifier which embodies limits representing the control surface limits of the missile. The output of this amplifier is fed in parallel to the ground command-link transmitter 22 and to an analogue circuit of the missile aerodynamics, which is arranged to generate a signal representative of the lateral acceleration to which the missile would be subjected in response to the operator's demand. The output signal from this analogue circuit is fed to a further analogue circuit of the missile kinematics, which produces a signal proportional to the rate of turn of the line of sight of the missile. This latter signal is fed back into the high gain amplifier and used to back off the joystick control signal until a steady state is reached. The output signal from the high gain amplifier thus represents a permissible rate-of-turn control signal and it is this signal which is fed to the ground transmitter 22.

The analogue circuit of the missile kinematics must include a parameter proportional to the separation range of the missile and the target and hence this information is supplied to the circuit by the range signal transmitted from the missile to the ground receiver and fed to the shaping unit 21 from the strobe unit 44 (see FIG. 3).
In the ground transmitter 22 the control signals are converted into a suitable form for transmission by a sub-modulator unit 46. This unit produces a repetitive group of four sub-carrier oscillations, two for each control plane, the period for the pairs being equal. The magnitude and sign of a control signal for pitch control is represented by the state of the time sharing of two of the sub-carrier oscillations and the magnitude and sign of a control signal for yaw control is represented by the state of the time sharing of the other two sub-carrier oscillations.

The sub-carrier oscillations are applied to an amplitude modulator 47, where they amplitude modulate a main carrier. The amplitude-modulated carrier oscillation is fed to a transmitter 48, from which it is radiated to the missile.

Referring again to FIG. 2, the oscillations transmitted by the ground transmitter 48 are received by command-link receiver 23 in the missile where they are converted to I.F. by mixing with the output of a local oscillator 49 and amplified in an I.F. amplifier 50 in conventional manner. The four sub-carrier oscillations are separated by a filter unit 51 and applied, as four separate inputs, to a demodulator 52. The demodulator 52 converts the variable-dwell modulations into D.C. signals proportional to the original control signals. The reconstituted control signals are applied to the inputs of servo amplifiers for the appropriate missile control surface actuators 53 and 54.

In addition there is provided a control system within the missile which serves:

(i) To roll stabilize the missile to ensure that deflection under joystick control and the resulting missile manoeuvre are accomplished with a fixed roll attitude, and
(ii) To improve the aerodynamic response to control signals.

To obtain a fixed roll attitude a roll gyroscope is employed to measure error in roll position relative to a datum. This error is converted to an electrical signal, and caused to actuate the aerodynamic control surfaces in such a sense as to reduce this error to zero. An exemplary roll stabilizing system for accomplishing this result is that described in an article by the inventor entitled "Semi-Active Homing" in the June 1959 issue of "Control," Volume 2, No. 12, published by Rowse Muir Publications Limited, London, England. Stability of the roll control loop is achieved by suitably shaping the error signal. The overall effect of this control loop is to hold the missile's roll attitude fixed, relative to a datum.

The aerodynamic response can be improved by damping the missile weathercock oscillation. This is achieved by measuring the missile's lateral rates-of-turn in pitch and yaw by two rate gyroscopes, and feeding their outputs in a negative sense to the inputs of the amplifiers of the respective control surface actuators. This negative feedback of rate of turn has the effect of increasing the damping of the missiles aerodynamic response to control signals received from the ground station.

What I claim as my invention and desire to secure by Letters Patent is:

1. A guidance system for a missile or other moving body comprising a surface-based radar signal transmitter for illuminating a remote target; a radar signal receiving dish mounted in the body for receiving radar signals reflected from the remote target; means including said radar signal receiving dish for generating information-carrying signals containing measurements of the relative angular position of the target with respect to the body, said generating means including means to produce a reference oscillation and means to derive from the reflected radar signals received from the target an oscillation the phase angle of which in relation to the reference oscillation is a measure of the angle between the projection of the body-to-target sight line onto a plane at right angles to the axis of the dish and a datum line in said plane; a radio transmitter mounted in the body for transmitting said information-carrying signals; a receiver located at an operator's station for receiving said information-carrying signals; a display device located at the operator's station and responsive to the received information-carrying signals to produce a visual representation of the relative angular position of the target with respect to the body; a manually operable control device for operation by a human operator to generate control signals in response to manual adjustment thereof; a further radio transmitter at the operator's station for transmitting said control signals; a further receiver mounted in the body for receiving said control signals; and a control system in the body responsive to the received control signals to guide the body in accordance with the operator's adjustments of the manually operable control device.

2. A system according to claim 1, wherein the oscillation derived from the target-reflected radar signals and the reference oscillation have frequencies equal to the spin frequency of the said dish, and wherein the reference oscillation bears a constant phase with respect to the spin frequency of the dish.

3. A system according to claim 2, wherein the datum line is coincident with the pitch axis or the yaw axis of the body.

4. A system according to claim 1, wherein the body is provided with a further radar signal-receiving device for the reception of radar signals direct from the surface-based transmitter for generating a range signal proportional to approximately the distance between the target and the body.

5. A system according to claim 4, wherein the body radio transmitter includes a time-multiplex unit in which the oscillation derived from the target-reflected radar signals, the reference oscillation and the range signal are time multiplexed into a signal of complex wave form for transmission to the operator's station.

6. A system according to claim 5 wherein the surface-based receiver includes a de-multiplexing unit to de-multiplex the two transmitted oscillations, and a resolver responsive to the de-multiplexed oscillations to generate two signals respectively representative of the pitch and yaw error of the body from the dish axis.

7. A system according to claim 6, wherein the display device comprises a cathode ray tube to which the pitch and yaw error signals are fed to give a direct visual display of the position of the target in relation to the body.

8. A system according to claim 5 further comprising means in the receiver located at the operator's station for de-multiplexing the range signal; a signal shaping unit to which said range signal and the control signals of the manually operable control device are applied, said signal shaping unit including an analogue circuit of the body aerodynamics and an analogue circuit of the body kinematics, the latter circuit depending on a variable parameter which follows the range of the body from the target.

References Cited by the Examiner

UNITED STATES PATENTS

| 2,557,401 | 6/51 | Agins et al. | 244—14 |
| 2,616,031 | 10/52 | Nosker | 244—14 |
| 2,745,095 | 5/56 | Stoddard | 340—6 |
| 2,950,477 | 8/60 | Alpers | 244—14 X |
| 3,029,426 | 4/62 | Robinson | 244—14 |

SAMUEL FEINBERG, *Primary Examiner.*

CHESTER L. JUSTUS, *Examiner.*